United States Patent [19]

Delaruelle et al.

[11] Patent Number: 5,095,523
[45] Date of Patent: Mar. 10, 1992

[54] SIGNAL PROCESSOR INCLUDING PROGRAMMABLE LOGIC UNIT FORMED OF INDIVIDUALLY CONTROLLABLE OUTPUT BIT PRODUCING SECTIONS

[75] Inventors: Antoine Delaruelle; Bart J. S. De Loore; Patrick J. M. De Bakker, all of Eindhoven, Netherlands

[73] Assignee: U.S. Philips Corporation, New York, N.Y.

[21] Appl. No.: 319,008

[22] Filed: Mar. 3, 1989

[51] Int. Cl.⁵ .................... G06F 7/00; H03K 19/173
[52] U.S. Cl. .................. 395/800; 364/232.93; 364/238; 364/259; 307/465
[58] Field of Search ............ 364/716, 200 MS File, 364/900 MS File; 307/465

[56] References Cited

U.S. PATENT DOCUMENTS 4,415,818  11/1983  Ogawa et al. .................. 364/716
4,772,811  9/1988  Fujioka et al. ................. 364/716

Primary Examiner—Allen R. MacDonald
Assistant Examiner—Debra A. Chun
Attorney, Agent, or Firm—Jack D. Slobod

[57] ABSTRACT

A programmable logic unit performs only monadic, dyadic logic bit level, rather than arithmetic, operations in order to achieve high speed. The unit is formed of section for each output bit position. Each section includes a general function block which simultaneously performs as desired, one or more of the operations cntl1.A.B, cntl2.A.$\overline{B}$, cntl3.$\overline{A}$.B and cntl4.$\overline{A}$.$\overline{B}$, wherein A, $\overline{A}$, B, $\overline{B}$ and cntl1 to cntl4 are logic signals and control signals respectively. The inputs of the general function block are connected to a data distribution bus via a multiplex circuit. This connection between the multiplex inputs and the distribution bus can be selected as desired (once), so that the number of different logic operations that can be selected is very large.

13 Claims, 2 Drawing Sheets

SIGNAL PROCESSOR INCLUDING PROGRAMMABLE LOGIC UNIT FORMED OF INDIVIDUALLY CONTROLLABLE OUTPUT BIT PRODUCING SECTIONS

BACKGROUND OF THE INVENTION

1. Field of the Invention

The invention relates to a programmable logic unit for executing dyadic or monadic operations and bit-wise operations on data, presented to inputs of the unit, under the control of instructions presented to control inputs. The invention also relates to a signal processor comprising a plurality of parallel-operating programmable logic unit sections, one for each output bit position.

2. Description of the Prior Art

A publication of the "6$^{th}$ Symposium on Computer Arithmetic", June 20-22, 1983, Aarhus, Denmark, pages 10-16, discloses an arithmetic and logic unit which is capable of executing not only dyadic and monadic operations but also adding operations and is also capable of processing and generating carry signals. In many digital signal processing applications, however, adding operations and carry signals are not required, so that in those cases the processing of digital signals by the arithmetic and logic unit is slower than actually necessary. From said publications it is also known to use several arithmetic and logic unit sections in parallel for the execution of multi-bit operations. Such a parallel-operating unit (ALU) is described, for example in U.S. Pat. No. 4,498,135 where the ALU is connected between on the one side a shifter connected to one input, a multiplier connected to the other input and an accumulator connected to the output. Such a configuration offers a versatile tool for executing logic and arithmetic operations, but usually executes operations very inefficiently in time, because it is necessary to traverse an excessive number of stages which need not execute an operation at that instant.

SUMMARY OF THE INVENTION

It is an object of the invention to provide a programmable logic unit whose construction is simpler than that of an arithmetic and logic unit and which is capable of executing the cited operations faster than such arithmetic and logic unit.

It is a further object of the invention to provide a signal processor in which the cited operations can be executed very efficiently in time.

To achieve this, a programmable logic unit in accordance with the invention is characterized in that each section thereof comprises a logic function block and multiplex circuits for the execution of logic operations, inputs of the multiplex circuits being connected to conductors of a data bus which present the operands, outputs of the multiplex circuits being connected to inputs of the logic function block, outputs of which are connected to an output bus via output buffers. The programmable logic unit in accordance with the invention enables the execution of not only dyadic and monadic operations but also bit-wise operations (such as shift, masking and scramble operations) which are very efficiently executed within a minimum period of time.

A preferred embodiment of a programmable logic unit is characterized in that the inputs of the multiplex circuits are connected in a programmable combinatory matrix to conductors of the data bus. This embodiment offers the advantage that the connections already required between the inputs of the multiplex circuits and an already present data bus can be established as desired (for example, once only), resulting in an additional possibility for executing logic operations. This additional programming possibility represents a substantial extension of the total number of logic functions wherefrom a potential user of the programmable logic unit can choose a number of functions which is determined by the programming of the combinatory matrix.

A signal processor in accordance with the invention comprises a plurality of parallel-operating programmable logic unit section of the described kind, which unit sections are connected to a data bus on the one side and to a data output bus on the other side. It will be apparent that each of the various programmable logic unit section is connected to the various data conductors of the data bus in accordance with a specific pattern to be selected once by the user.

A preferred embodiment of a signal processor in accordance with the invention is characterized in that the control inputs of the logic function blocks for the same logic operations are interconnected. In this embodiment of the signal processor in accordance with the invention the number of control lines is advantageously limited.

Further attractive embodiments of a signal processor in accordance with the invention are disclosed in the dependent claims.

Embodiments in accordance with invention will be described in detail hereinafter, by way of example, with reference to the accompanying drawing; therein:

DETAILED DESCRIPTION OF THE PREFERRED EMBODIMENTS

Figure 1:
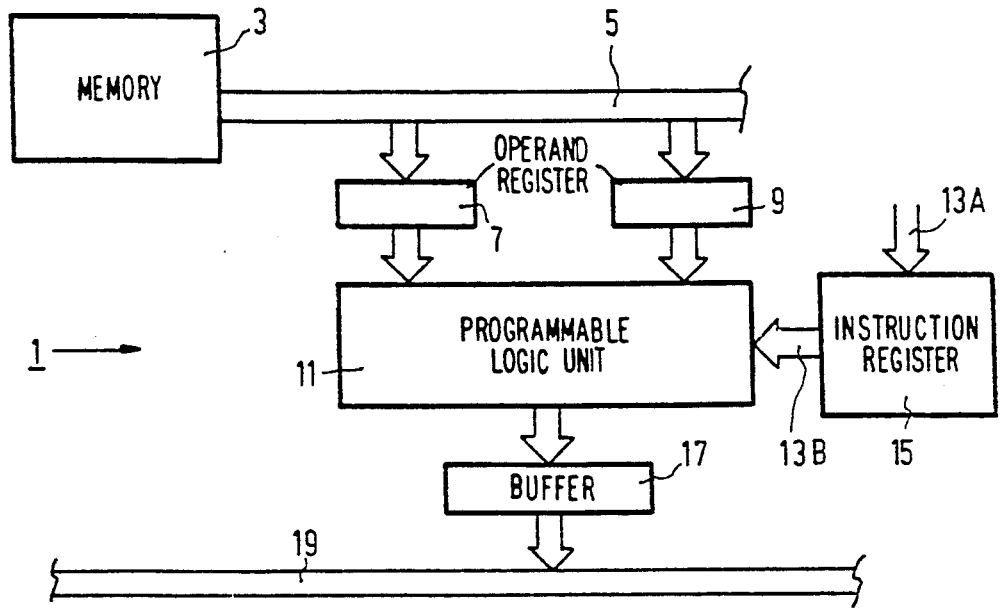
FIG. 1 shows a part of a signal processor comprising a programmable logic units in accordance with the invention.

FIG. 1 shows a part of a signal processor 1 which comprises a memory 3 whereto there is connected a data bus 5 whereto a first register 7 and a second register 9 are connected. The registers 7 and 9 serve for the storage of a number of operands which are processed by the programmable logic unit 11. The capacity of the registers 7 and 9 is to be determined by the user of the processor 1 and depends, for example on the application of the signal processor 1. The storage of the various operands in the registers 7 and 9 aims to prevent overloading of the data bus 5. The logic operations to be executed by the programmable logic unit 11 are selected in the instruction register 15, via a bus 13A, and are applied to the unit 11 via an instruction bus 13B. The result of the operations performed on the operands by the programmable logic unit 11 is applied to a data output bus 19 via a buffer 17. The memory 3, the data bus 5, the bus 13A, the instruction register 15 and the data output bus 19 are known elements of a signal processor which usually cooperates with a known arithmetic and logic unit ALU (not shown) of the signal processor which will be included in the signal processor, in addition to the programmable logic unit 11 shown, if arithmetic operations are also to be executed.

Figure 2:
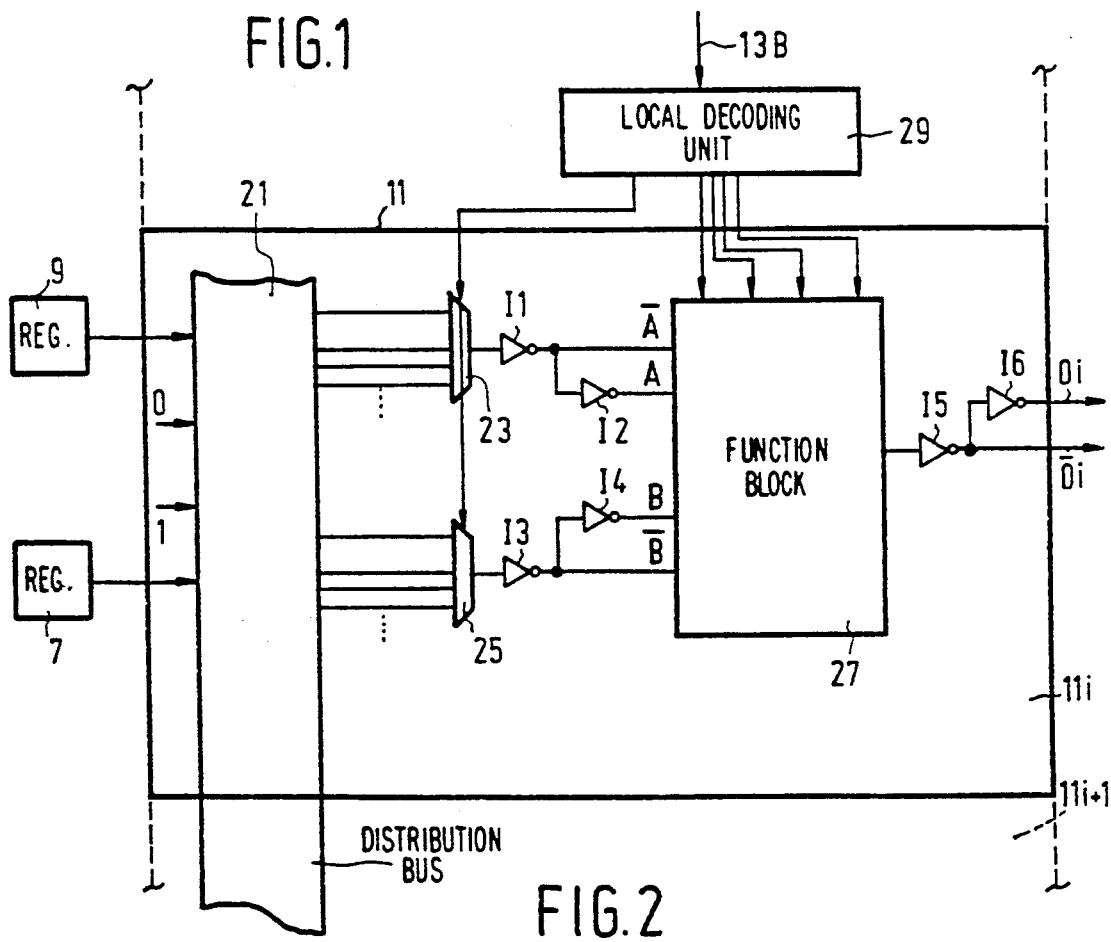
FIG. 2 shows a section of a programmable logic unit in accordance with the invention.

FIG. 2 is a more detailed representation of a section i of a programmable logic unit 11. The logic unit 11 comprises n of such sections (for example, n=8). The section 11i is fed from a distribution bus 21 of the programmable logic unit 11 and; comprises a first multiplexer 23, a second multiplexer 25, and a general function block 27. As appears from the figure, the distribution bus 21 extends through all logic units 11i, 11i+1, etc. and the registers 7 and 9 are connected thereto. The inputs of the multiplexers 23 and 25 are to be connected to the various conductors of the distribution bus 21 as desired by the user of the processor 1. The multiplexers 23 and 25 are controlled by a local decoding unit 29 which receives an instruction on an input via the instruction bus 13B. The local decoding unit 29 also controls the general function block 27. In one embodiment the decoding unit controls all n function blocks 27 of the logic unit 11, thus determining which logic operation is performed on the operands supplied via the registers 7 and 9. The outputs of the local decoding unit 29 separately control the multiplexers 23 and 25 and also applied to all further multiplexers of the various section 11i of the programmable logic unit 11 incorporated in the signal processor 1. The output of the multiplexer 23 is connected to an input of the general function block 27 via an inverter I1. Furthermore, via a second inverter I2 the output of the inverter I1 is connected to a second input of the general function block 27. Similarly, the output of the multiplex switch 25 is connected to inputs of the general function block 27 via a first inverter I3 and via a second inverter I4 connected to the inverter I3. The outputs of the inverters I1 to I4 supply the signals $\overline{A}$, A, $\overline{B}$ and B, respectively, when the multiplexers 23 and 25 supply the signals A and B, respectively. Via inverters I5 and I6, the logic result generated in the section 11i is applied to the outputs $\overline{O}i$ and Oi.

Figure 3:
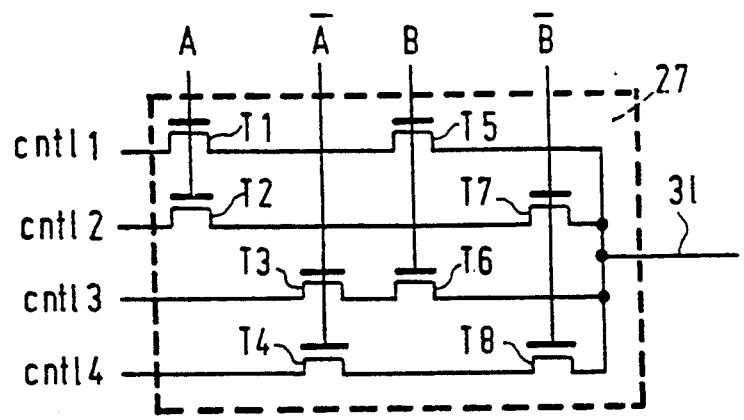
FIG. 3 shows the transistor diagram of a general function block.

FIG. 3 shows a transistor diagram of a known general function block 27. The signals A, $\overline{A}$, B and $\overline{B}$ are applied to four inputs of the function block 27. The signal A is applied to the control electrodes of transistors T1 and T2, the signal $\overline{A}$ being applied to transistors T3 and T4, while the signals B and $\overline{B}$ are applied to transistors T5, T6 and transistors T7, T8, respectively. The function block 27 comprises four control inputs CNTL1 to CNTL4, whereby the logic function to be executed by the function block 27 is selected. When the control signal CNTL1 is logic "high" and the inputs A and B of the function block 27 are "high", the signal A.B will appear on output 31 of the function block. An OR-function can be created on the output 31 by making several control signals logic "high". It will be apparent from the transistor diagram of the general function block 27 that this block is capable of executing all monadic and dyadic operations.

Figure 4:
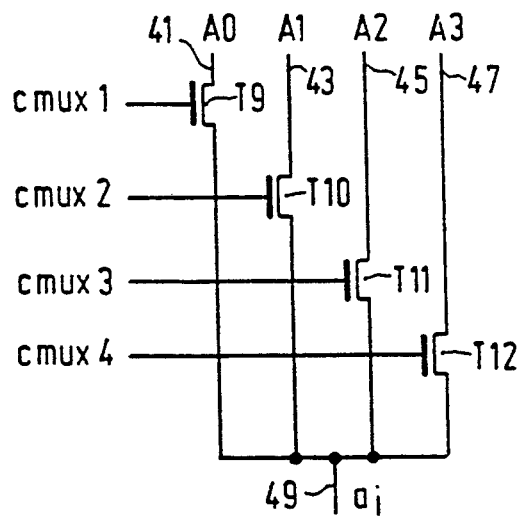
FIG. 4 shows the transistor diagram of a multiplex circuit.
Figure 5:
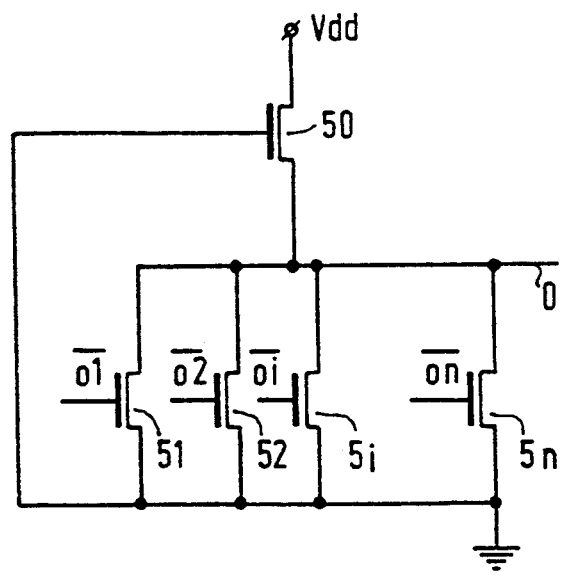
FIG. 5 shows the transistor diagram of the output AND-gate.

FIG. 4 shows a transistor diagram of a multiplex circuit which can be used in every section 11i of a programmable logic unit. The multiplexer shown in the figure comprises four transistors T9, T10, T11 and T12, each of which can be turned on and off by a separate signal on the inputs CMUX1 to CMUX4, respectively. Inputs 41, 43, 45 and 47 receive respective signals A0, A1, A2 and A3, one of which can be conducted to output 49 by controlling one transistor via one of the inputs CMUX1 to CMUX4. It makes sense to operate the multiplexers 23 and 25 with separate control inputs, as shown in FIG. 2, so that the number of control signals 7 from the local decoding unit 29 to the multiplex circuits 23 and 25 amounts to eight when use is made of the multiplex circuit shown in FIG. 4.

It has been found that it is advantageous when it can be tested whether the output of all logic function units generates a logic "high" signal. To achieve this, there is provided a NOR-gate whose inputs receive the output signal $\overline{O}i$ of the general function block 27, via the inverter I5. The output of the inverter I5 of each logic function block in the section 11i of the logic unit 11, where i extends from 1 to n, is connected to the input of a transistor 5i, where i extends from 1 to n, said transistors 5i being connected in parallel between ground on the one side and a depletion MOS transistor 50 on the other side, which transistor 50 constitutes a connection to the supply voltage $V_{DD}$. The control electrode of the transistor 50 is connected to ground. The output O of this NOR-gate supplies an output signal which is the AND-function of the output signals Oi of the sections 11i of the programmable logic unit 11.

The programmable logic unit in accordance with the invention is suitable for executing not only logic operations as described above, but also multiplications in the so-called Galois field, as will appear from the following example.

The execution of a multiplication of an 8-bit word IN(0) to IN(7) by a constant in the Galois field, which multiplication can be represented by the following logic operations:

OUT(0) = IN(7)
OUT(1) = IN(0)
OUT(2) = IN(1)⊕IN(7)
OUT(3) = IN(2)⊕IN(7)
OUT(4) = IN(3)⊕IN(7)
OUT(5) = IN(4)
OUT(6) = IN(5)
OUT(7) = IN(6), requires only one general function block (width 8 bits) and associated multiplex circuits and distribution bus. The result becomes available within one clock cycle.

If use were made of a conventional processor with a known arithmetic and logic unit, there would be required three general function blocks, one carry bit block, one carry look-ahead circuit, one shifter and one register for the storage of the constant; moreover, at least three clock cycles would then be required one for shifting the word; one for condition testing (of input 7) and one for executing the EXCLUSIVE-OR operation with a constant.

An extension of the programmable logic unit in accordance with the invention is capable of operating on three logic signals A, B and C. If such is necessary the signals A and B are applied to the four inputs as shown in FIG. 2 and the output Oi and $\overline{O}i$ of the general function block are used as inputs for a second general function block, further two inputs of which will receive the signals C and $\overline{C}$.

In theory, n+1 logic signals can be processed in a ripple-through-operation if n general function blocks are cascaded. Of course such a cascade circuit of n general function blocks will cause a signal delay between input and output of approximately n gate delays, which delay must be shorter than the clock pulse period in order to ensure that the system will still be a clock synchronous operating system.

We claim:

1. A signal processor for executing dyadic or monadic and bit-wise operations on operand data presented by an input data bus to produce result data presented to an output data bus in accordance with instruction data presented on an instruction bus, said processor comprising:
- a programmable logic unit formed of a plurality of logic unit sections, each comprising a logic function block for determining at an output of said block the value of a different bit position of the result data, said logic function block being configured for execution of a logic operation, selectable from a set of logic operations, on one or more input bits in response to first control signals indicative of the logic operation selected from said set;
- multiplex means responsive to said input data bus for presenting selectable bit positions of said operand data from said input data bus as said input bits to said logic unit sections in response to second control signals indicative of the bit positions of said operand data selected;
- control means responsive to said instruction bus for presenting said first control signals to the logic function blocks and said second control signals to said multiplex means; and
- output buffer means for receiving the values of the bit positions of the result data output from said logic unit sections and presenting said values as said result data to said output data bus.

2. The signal processor as claimed in claim 1 in which said multiplex means comprises first and second simultaneously operable, multiplex circuits for respectively selecting bit positions from first and second operand data for presentation to said logic units.

3. The signal processor as claimed in claim 2, wherein each multiplex circuit comprises four inputs and one output.

4. The signal processor as claimed in claim 2 wherein said control means controls said multiplex circuits for operation independently of each other.

5. The signal processor as claimed in claim 2 wherein said second control signals comprise a first subset for control of said first multiplex circuit and a second subset for control of said second multiplex circuit.

6. A signal processor as claimed in claim 1, further comprising a logic gate having a plurality of inputs respectively fed by said outputs of said logic unit sections, said gate performing a logic AND-function with respect to said plurality of inputs.

7. A signal processor as claimed in claim 6, wherein the output buffer means presents inverted as well as non-inverted result data to said data output bus, said inverted result data being applied to the logic gate which is a NOR-gate.

8. The signal processor as claimed in claim 1 characterized in that the multiplex means comprises a controllable combinatorial means for presenting selected combinations of bit positions of said operand data from said input data bus to said programmable logic unit sections.

9. The signal processor as claimed in claim 1 wherein an inverter circuit is connected between each logic function block and the multiplex means in order to apply the selected bit positions of the operand data to each logic function block in both inverted and non-inverted form.

10. The signal processor as claimed in claim 1, wherein said operand data comprises first and second operand data, wherein said first control signals for each logic function block comprise four control signals CNTL1 to CNTL4, and wherein the logic function block executes one or more of the following logic operations on bit positions A and B respectively selected from said first and second operand data: $CNTL1.A.B$, $CNTL.A.\bar{B}$, $CNTL3.\bar{A}.B$ or $CNTL4.\bar{A}.\bar{B}$.

11. The signal processor as claimed in claim 1, wherein said output buffer means presents inverted as well as non-inverted result data to said output data bus.

12. The signal processor of claim 1 wherein said control means is such that the same first control signals are presented to each of said logic function blocks.

13. The signal processor as claimed in claim 1 wherein said control means comprises a programmable logic array (PLA) producing said control signals.

* * * * *